United States Patent [19]

Hein et al.

[11] Patent Number: 5,413,319

[45] Date of Patent: May 9, 1995

[54] FLUID DAMPED BUSHING

[75] Inventors: Richard D. Hein, Wabash; Paul T. Wolfe; Douglas M. McLelland, both of Ft. Wayne, all of Ind.

[73] Assignee: GenCorp Inc., Fairlawn, Ohio

[21] Appl. No.: 289,026

[22] Filed: Aug. 10, 1994

[51] Int. Cl.$^6$ ............................................. F16M 1/00
[52] U.S. Cl. .............................. 267/140.12; 267/219; 267/141.3
[58] Field of Search ............... 267/140.11, 140.12, 267/140.13, 141.2–141.5, 219, 293; 248/562, 636; 180/300, 312

[56] References Cited

U.S. PATENT DOCUMENTS

| | | | |
|---|---|---|---|
| 4,440,254 | 4/1984 | Shibahata et al. | 180/140 |
| 4,588,174 | 5/1986 | Konishi | 267/140.1 |
| 4,702,346 | 10/1987 | Uno et al. | 267/140.12 |
| 4,712,775 | 12/1987 | Buma et al. | 267/220 |
| 4,786,036 | 11/1988 | Kanda | 267/140.1 |
| 4,817,926 | 4/1989 | Schwerdt | 267/140.1 |
| 4,865,299 | 9/1989 | Goto | 267/140.1 |
| 4,899,997 | 2/1990 | Thorn | 267/140.1 |
| 4,936,557 | 6/1990 | Schwerdt | 267/140.12 |
| 5,024,425 | 6/1991 | Schwerdt | 267/140.1 |
| 5,042,785 | 8/1991 | LeFol et al. | 267/140.1 |
| 5,060,918 | 10/1991 | Kanda | 267/140.1 |
| 5,088,702 | 2/1992 | Thelamon et al. | 267/140.1 |
| 5,158,269 | 10/1992 | Hein et al. | 267/220 |
| 5,280,885 | 1/1994 | Noguchi | 267/140.1 |

FOREIGN PATENT DOCUMENTS 5001741  1/1993  Japan ............... 267/140.12

*Primary Examiner*—Robert J. Oberleitner
*Assistant Examiner*—Chris Schwartz
*Attorney, Agent, or Firm*—Robert F. Rywalski; Thomas A. Meehan

[57] ABSTRACT

A fluid damped bushing (10) comprising a metallic sleeve (12) and an annular elastomeric body (14) mold bonded to the exterior of the metallic sleeve. The elastomeric body has a spaced apart pair of fluid containing recesses (16, 18) in its exterior surface with an intermediate recess (20) positioned between the fluid containing recesses. An inertia track plate (22), which is formed from a relatively rigid material, is positioned within the intermediate recess, and the track plate has a flow passage (24) formed in its exterior surface, opposed ends of the flow passage being in fluid communication with the fluid containing recesses. The bushing is circumscribed by longitudinally short, metallic rings (26, 28) on longitudinally opposed sides of the recesses, and is then tightly surrounded by a metallic sleeve (30) which has an elastomeric inner liner (32) mold bonded to its interior surface.. The elastomeric body also has a second intermediate recess (34), which is like the intermediate recess (20) and which is diametrically opposed thereto, and the second intermediate recess is also fitted with a track plate (36). The track plate (36) is like the inertia track plate (22), except that the track plate is not provided with a flow passage corresponding to the flow passage (24).

9 Claims, 2 Drawing Sheets

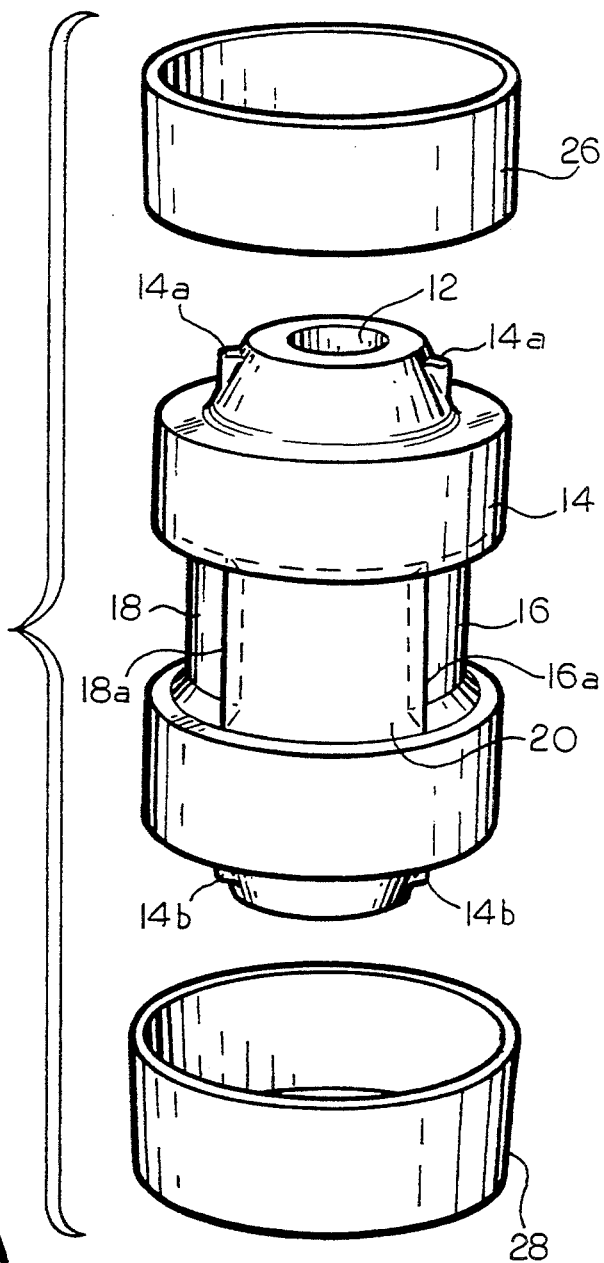
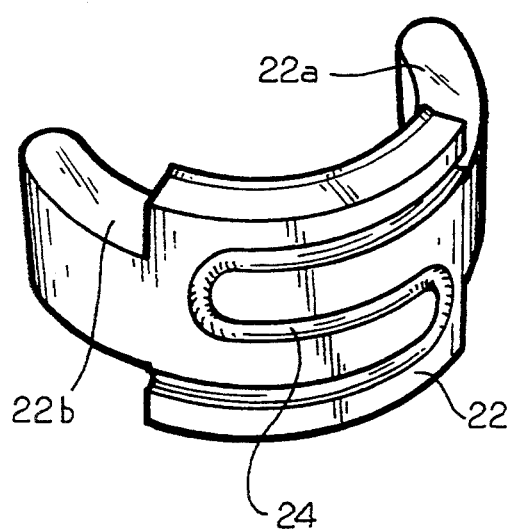

FLUID DAMPED BUSHING

FIELD OF THE INVENTION

This invention relates to a fluid damped resilient bushing of a type used in automotive suspension or power train systems to improve the noise, vibration and handling characteristics of an automotive vehicle.

BACKGROUND OF THE INVENTION

Fluid damped bushings are used in automotive suspension and power train applications to improve the noise, vibration and handling characteristics of the automotive vehicle. Typically, such a fluid damped bushing has an inner metal sleeve to which is bonded an elastomeric, resilient annular member. The annular member has a spaced apart pair of recesses in its outer surface, and the recesses are interconnected by a flow passage that has a high resistance to flow. The resilient member is then surrounded by an outer metal sleeve which seals the recesses and the flow passage of the resilient member. This construction typically requires that an intermediate sleeve, known as a window metal, be inserted between the resilient member and the outer sleeve, and the window sleeve must be provided with openings to be aligned with the recesses in the resilient member. This intermediate window metal sleeve is expensive to manufacture, and its assembly to the outer sleeve results in a high compression stress on a thin rubber layer located between the outer metal and the intermediate metal, usually as a lining on the inside surface of the outer sleeve, because of the requirement that the rubber layer act as a sealing member.

BRIEF SUMMARY OF THE INVENTION

According to the present invention there is provided a fluid damped bushing which is simpler in construction than fluid damped bushings of the prior art. The fluid damped bushing of the preferred embodiment of the present invention eliminates the need for the window metal element of prior art fluid damped bushings by replacing the window metal with a preformed, preferably metallic, inertia track plate in the space between the fluid containing recesses of the bushing, with a pair of longitudinally short and longitudinally spaced apart metallic cylinders at the longitudinally opposed ends of the elastomeric body. This construction opens the entire central portion of the elastomeric body to the formation of the required internal recesses or cavities, while maintaining the structural strength of a bushing subassembly during its assembly to the outermost metallic sleeve, with the requisite swaging and crimping operations that are performed as part of such assembly.

The flow passage in the inertia track plate is cast, stamped or machined into its outermost surface, and the size of the flow passage can be controlled to provide the requisite damping effect of the bushing.

Accordingly, it is an object of the present invention to provide an improved fluid damped bushing. More particularly, it is an object of the present invention to provide a bushing of the foregoing character which may be produced to close tolerances in a repetitive manufacturing operation at a reasonable cost.

For a further understanding of the present invention and the objects thereof, attention is directed to the drawing and the following brief description thereof, to the detailed description of the preferred embodiment and to the appended claims.

BRIEF DESCRIPTION OF THE DRAWING

FIG. 3 is a perspective view of an element of the bushing of FIGS. 1 and 2; and

FIG. 4 is an exploded perspective view of other elements of the bushing of FIGS. 1 and 2.

DETAILED DESCRIPTION OF THE PREFERRED EMBODIMENT

Figure 2:
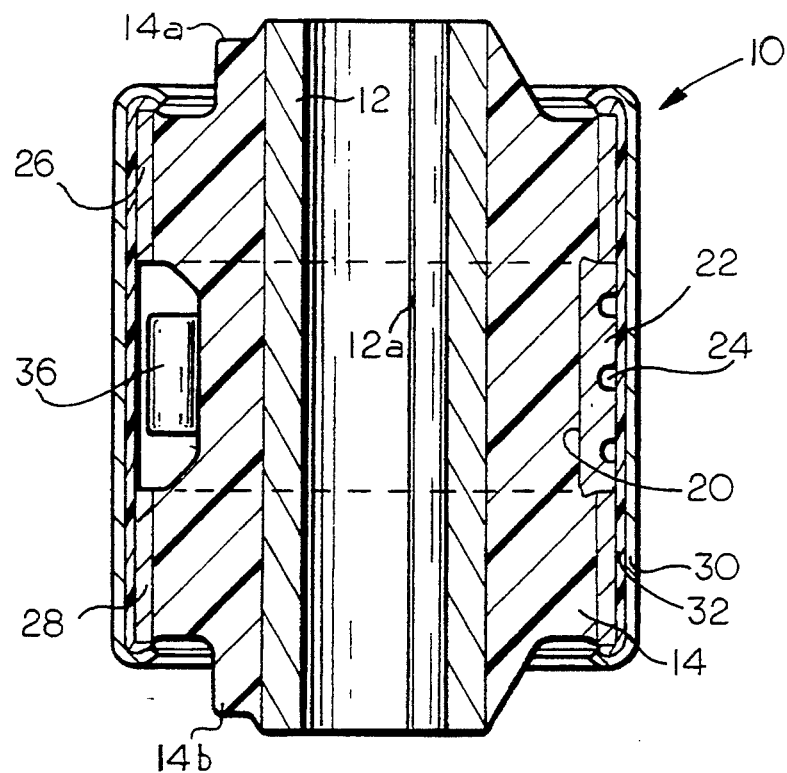
FIG. 2 is a cross-sectional view taken on line 2—2 of FIG. 1.
Figure 1:
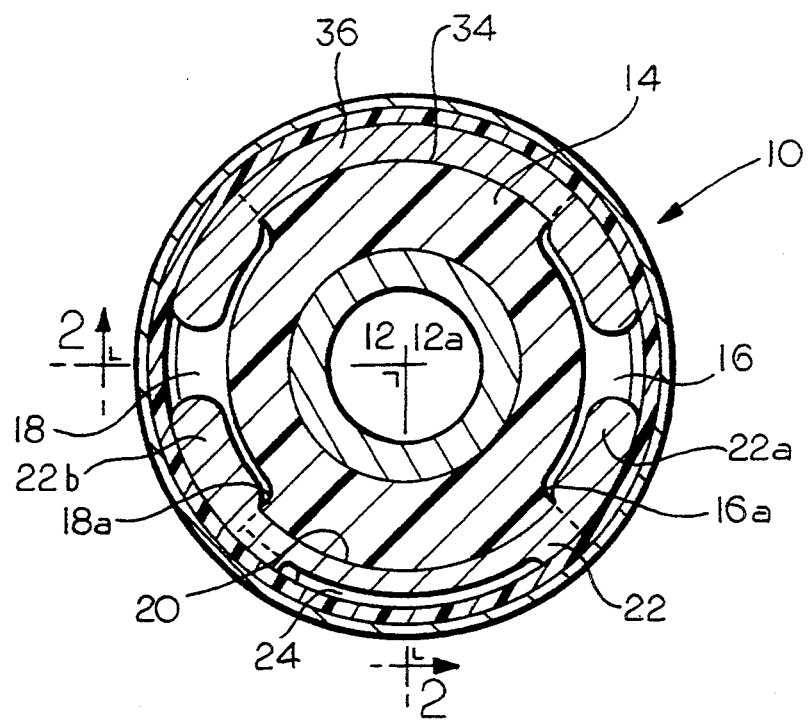
FIG. 1 is a cross-sectional view of a fluid damped bushing according to the preferred embodiment of the present invention, a view taken on a plane extending transversely on the longitudinal central axis of the bushing.

A bushing according to the preferred embodiment of the present invention is identified generally by reference numeral 10 in FIGS. 1 and 2. The bushing 10 is made up of an inner metal sleeve 12, and the sleeve 12 is mold bonded in surface-to-surface contact to the inner surface of an annular elastomeric body 14. The metal sleeve 12 is shown as having a longitudinal seam 12a, but it can also be of seamless construction.

The annular elastomeric body 14 is molded with a spaced apart pair of recesses 16, 18 in its outer surface, each of the recesses 16, 18 beginning below the uppermost extent of the elastomeric body 14 and ending above the lowermost extent of the elastomeric body 14, in the arrangement as illustrated in FIG. 2. The elastomeric body 14 is further molded with another recess 20 between the recesses 16, 18 and in fluid communication with the recesses 16, 18.

Restricted flow communication between the recesses 16, 18 by way of the recess 20 is provided by an inertia track plate 22, which is snugly fitted into the recess 20. The track plate 22 is formed from a relatively rigid material, such as die cast aluminum or a molded high durometer elastomeric material, and has a restricted, serpentine-shaped passage 24 formed or machined into its outer surface. Passage 24 has opposed ends which are in fluid communication with the recesses 16, 18, respectively. The track plate 22, which is arcuately shaped in its orientation as illustrated in FIG. 1 and as further illustrated in FIG. 3, is provided with opposed end tabs 22a, 22b, and the tabs 22a, 22b extend into the recesses 16, 18, respectively, and serve to accurately position the track plate 22 relative to the recesses 16, 18, respectively. In that regard, the radial thickness of the tabs 22a, 22b is greater than the radial thickness of the portion of the track plate 22 therebetween, to thereby center the track plate with respect to shoulders 16a, 18a of the recesses 16, 18, respectively, since the radial depth of the recesses 16, 18 is greater than the radial depth of the recess 20. The tabs 22a, 22b, by virtue of their increased radial thickness, also serve as stops during radial deflection of the inner metal 12 relative to an outer metal sleeve 30, as hereinafter described.

The bushing 10 is supported, above and below the level of the recesses 16, 18, 20, by a spaced apart pair of retaining rings 26, 28, which are mold bonded to the elastomeric body 14. As is shown in FIG. 2, the lowermost edge of the ring 26 abuts the uppermost edge of the track plate 22, and the uppermost edge of the ring 28 abuts the lowermost edge of the track plate 22. Thus, the rings 26 and 28, which are preferably formed from steel, serve to positively position the track plate 22 in a direction extending parallel to the longitudinal central axis of the bushing 10.

The elastomeric body 14 is also provided with a second intermediate recess 34, which is like the intermediate recess 20 and is diametrically opposed to the recess 20. A plate 36 is fitted into the recess 34, and the plate 36 is like the plate 22, except that the plate 36 is not provided with a passage corresponding to the passage 24. The purpose of the plate 36 is to balance the crimping forces that the elastomeric body 14 experiences when it is assembled into the outer metal sleeve 30, as hereinafter described. However, the inclusion of a passage corresponding to the passage 24 of the plate 22 in the plate 36 would only reduce the damping effect of the bushing 20 by providing a second flow passage between the recesses 16, 18.

A subassembly of the bushing 10, which is made up of the sleeve 12, the elastomeric body 14, the rings 26, 28, the track plate 22 and the plate 36, is assembled into its final configuration by immersing the subassembly in a suitable damping fluid to allow the fluid to fill each of the recesses 16, 18 and the passage 24 of the track plate 22. In that regard, a suitable damping fluid can be an aqueous solution of ethylene glycol, or an aqueous solution of propylene glycol, or a mixture of such solutions. While in the damping fluid, the subassembly is pressed into an outer metal sleeve 30 which is lined on its inner surface with a pre-applied elastomeric sealing liner 32. The sleeve 30 has one of its opposed ends rolled in before the assembly step to serve as a stop for an outermost end of one or the other of the rings 26, 28. Then, the sleeve 30 is preferably swaged to slightly reduce its diameter, to thereby ensure a good surface-to-surface seal between the inside surface of the sealing liner 32 and the outside surfaces of the rings 26, 28. Thereafter, the other of the opposed ends of the sleeve 30 is crimped in against the outermost end of the other of the rings 26, 28, to form a fluid tight assembly of all of the components of the bushing 10.

Preferably, the elastomeric body 14 is molded with directional tabs 14a, 14b projecting from its opposed ends. The tabs 14a, 14b have a predetermined circumferential position relative to the recesses 16, 18, whose position otherwise is not readily discernable after the elastomeric body 14 is surrounded by the sleeve 30.

Distortion of the elastomeric body 14 during the loads encountered in service will have the effect of reducing the volume of one of the recesses 16, 18 and increasing the volume of the other of such recesses by an equal amount. This will cause damping fluid to flow through the passage 24 of the track plate 22 into the recess of the recesses 16, 18 that is increasing in volume. The high restriction to flow of passage 24, which results from its length and its small cross-sectional area, will limit the rate at which the elastomeric body can distort under load, and the rate at which it can return to its unloaded shape when the load is removed. Thus, the fluid in recesses 16, 18 serves to dampen the distortion of the elastomeric body 14 in its reaction to the loads that it encounters in normal service and as it recovers from the removal of such loads.

Although the best mode contemplated by the inventor(s) for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A fluid damped bushing comprising:
   a rigid cylindrical member;
   an annular elastomeric member having an inner surface, said inner surface of said elastomeric member engaging an outer surface of said rigid cylindrical member in surface to surface contact, said annular elastomeric member further having a plurality of circumferentially spaced apart recesses in an outer surface thereof and an intermediate recess in the outer surface of said elastomeric member, the intermediate recess being spaced between an adjacent pair of spaced apart recesses;
   an arcuate inertia track plate positioned in said intermediate recess, said inertia track plate being formed from a relatively rigid material and having passage means extending therethrough to provide for flow of fluid therethrough between the adjacent recesses;
   first and second rings circumscribing said elastomeric member at locations external to the locations of said plurality of recesses and said intermediate recess;
   an outermost sleeve having an inwardly facing sealing member and circumscribing said elastomeric member and said first and second rings, said outermost sleeve being adapted to seal a damping fluid contained in the recesses;
   a substantially incompressible damping fluid contained in the recesses;
   wherein said elastomeric member further comprises a second intermediate recess in the outer surface of said elastomeric member, said second intermediate recess being like said intermediate recess and being diametrically opposed thereto, and further comprising;
   an arcuate plate positioned in said second intermediate recess, said arcuate plate being formed from a relatively rigid material and being like said arcuate inertia track plate except that said arcuate plate is not provided with passage means extending therethrough.

2. A fluid damped bushing according to claim 1 wherein said rigid cylindrical member is mold bonded to said annular elastomeric member.

3. A fluid damped bushing according to claim 2 wherein each of said first and second rings is formed of a metallic material and is mold bonded to said elastomeric material.

4. A fluid damped bushing according to claim 3 wherein said track plate has an upper edge and a lower edge, wherein one of said upper edge and said lower edge abuts an edge of one of said first and second rings, and wherein the other of said upper edge and said lower edge abuts an edge of the other of said first and second rings.

5. A fluid damped bushing according to claim 4 wherein said outermost sleeve has a first edge, said first edge being inturned and engaging an edge of one of said first and second rings, said outermost sleeve further having a second edge, said second edge of said outermost sleeve being inturned and engaging an edge of the other of said first and second rings.

6. A fluid damped bushing according to claim 5 wherein said outermost sleeve comprises a metallic sleeve and wherein said inwardly facing sealing liner is an elastomeric material and is mold bonded to an inner surface of said metallic sleeve.

7. A fluid damped bushing according to claim 6 wherein said inertia track plate comprises first and second opposed end tabs, each of said first and second end tabs extending into one of said plurality of recesses.

8. A fluid damped bushing according to claim 7 wherein each of said first and second end tabs of said inertia track plate has a radial thickness that is greater than the radial thickness of a portion of said inertia track plate that is between said first and second end tabs, and wherein each of said circumferentially spaced apart recesses has a radial depth that is greater than the radial depth of said intermediate recess and the radial thickness of the tab of said first and second end tabs which is received therein, said first and second end tabs thereby serving as mechanical stops to limit the extent of radial displacement of said rigid cylindrical member with respect to said outermost sleeve.

9. A fluid damped bushing according to claim 1 wherein said damping fluid is selected from the group consisting of an aqueous solution of ethylene glycol, an aqueous solution of propylene glycol and a mixture of an aqueous solution of ethylene glycol and propylene glycol.

* * * * *